3,382,527
HINGE FITTING FOR A SEAT AND BACK REST,
ESPECIALLY OF A MOTOR VEHICLE
Werner Strien, Stuttgart-Heumaden, and Jorg Resag, Stuttgart-Degerloch, Germany, assignors to Recaro A.G., Glarus, Switzerland, a corporation of Switzerland
Filed Mar. 5, 1965, Ser. No. 437,401
Claims priority, application Germany, Mar. 11, 1964,
R 37,425
10 Claims. (Cl. 16—146)

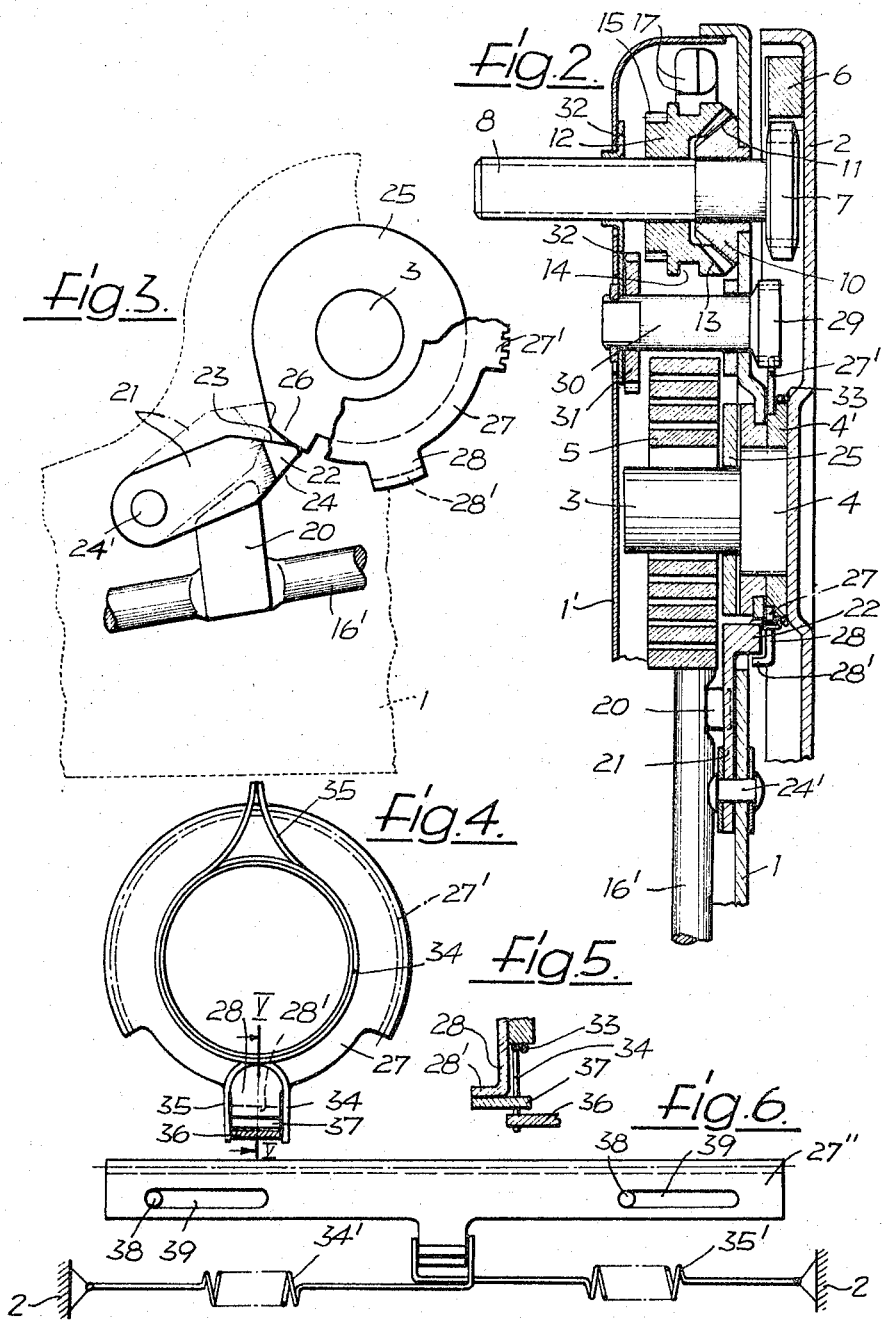

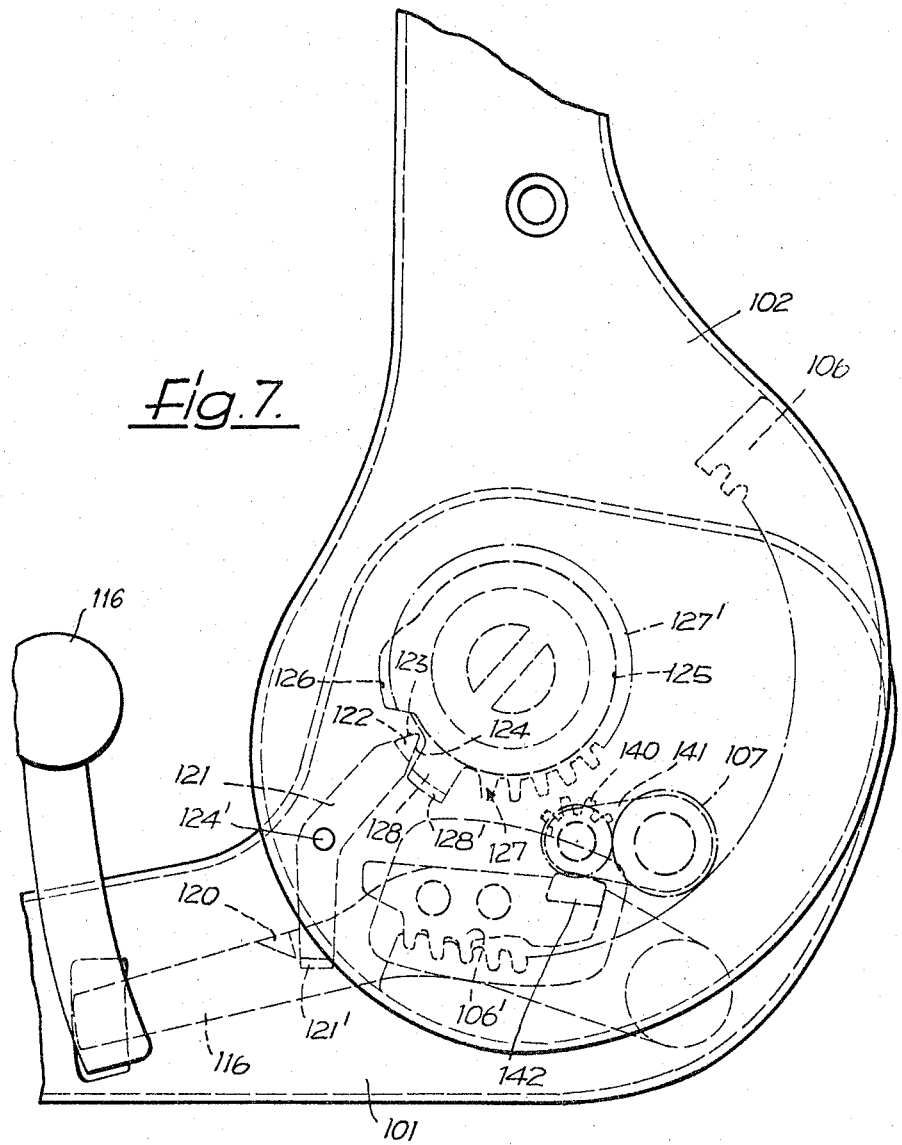

ABSTRACT OF THE DISCLOSURE

A hinge fitting for adjusting the inclination of the back rest of the seat comprising two hinge members pivotally connected to each other and respectively connected to the seat and back rest. A control member is provided which acts upon a movable locking member with a first latch member, which when the back rest is pivoted forwardly from a certain position in which it was previously locked and approaches the end of this forward movement, is caught by a second latch member which is mounted on and movable with the hinge member secured to the back rest, so that the control member is thereby arrested in its releasing position. A storing mechanism is further provided which, when the back rest is pivoted forwardly from a certain inclined position to which it was previously adjusted, memorizes the angular distance of the forward movement and, when the back rest is thereafter pivoted back freely automatically separates the two latch members when the back rest reaches its original position, so that the control member will then move back to its operative position and automatically lock the members and the back rest in the original position.

---

The present invention relates to a hinge fitting for adjusting the inclination of the back rest of a seat, in general, and to a hinge fitting for adjusting the inclination of the back rest of a seat, especially of a motor vehicle, which comprises a pair of hinge members which are to be secured to the seat and the back rest, respectively, and are connected to each other, so as to be pivotable to different angular positions relative to each other in which positions they may be rigidly locked to each other, and which further comprises a pair of locking members, one of which is rigidly secured to one of the hinge members, while the other locking member is associated with the other hinge member and movable relative thereto by means of a manually operated control member in particular.

Hinge fittings of this type are known in which the back rest may be locked in any desired inclined position and the control member in the form of a locking lever may be arrested on its releasing position and when the back rest is pivoted forwardly by means of associated latch members. When the back rest is again pivoted toward the rear, these latch members are disengaged by means of a stop projection on the hinge member which is to be secured to the back rest so that the locking members may then again be engaged with each other.

If the back rest is to be pivoted forwardly as far as possible, for example, in order to permit the passengers of a two-door car to enter the same and move to the back seats, the control member of such a hinge fitting only needs to be held by hand in the releasing position until the back rest has been pivoted beyond the most forward locking position, that is, the most forward position in which the locking members may still be engaged with and locked to each other. When the back rest is then pivoted toward the rear, the latch members which hold the control member in the inoperative position are then automatically disengaged, so that the control member again moves the locking members into engagement with each other and thereby locks the back rest again in a fixed position. These known hinge fittings have, however, the disadvantage that, when the back rest is pivoted beyond the most forward locking position and is thereafter again pivoted toward the rear, it will not be locked in the inclined position to which it was previously adjusted, but in a certain position different from the original position. This therefore requires the back rest to be newly adjusted to the original or any other desired inclined position.

It is an object of the present invention to provide a hinge fitting which, when the back rest is pivoted back from any forward position beyond the most forward locking position, automatically locks the back rest again in the same inclined position to which it was adjusted before it was pivoted forwardly.

It is another object of the present invention to provide a hinge fitting comprising a control member which acts upon a movable locking member with a first latch member which, when the back rest is pivoted forwardly from a certain position in which it was previously locked and approaches the end of this forward movement, is caught by a second latch member which is mounted on and movable with the hinge member which is to be secured to the back rest, so that the control member is thereby arrested in its releasing position, and by further providing a storing mechanism which, when the back rest is pivoted forwardly from a certain inclined position to which it was previously adjusted, memorizes or "stores" the angular distance of the forward movement and, when the back rest is thereafter pivoted back freely automatically separates the two latch members as soon as the back rest reaches its original position, so that the control member will then be immediately moved back to its operative position and thereby automatically lock the locking members and thus also the back rest in the original position.

It is another object of the present invention to provide a hinge member in accordance with the above-mentioned objective wherein the control member may consist of a locking lever which is mounted on the hinge member which is to be secured to the seat, and normally holds the locking members in their engaged position and is adapted to be moved manually to its releasing position.

The storing mechanism according to the invention may be provided in the form of a mechanically operating counter which is preferably controlled by a gearing.

It is still another object of the present invention to provide a hinge fitting in accordance with the above-mentioned objectives wherein the storing mechanism is provided with a resetting device for maintaining it in its zero position when the locking members are in engagement with each other. This resetting device insures that the storing mechanism will always be located in its zero position when the back rest is to be pivoted forwardly from any inclined position to which it was previously adjusted and in which it was then locked.

It is yet another object of the present invention to provide a hinge fitting in accordance with the above-mentioned objectives, wherein a counter is provided with a gearing, and this gearing is adapted so that one gear wheel thereof may be moved by means of the locking lever in such a manner relative to another gear wheel which is positively turned when the back rest is being pivoted that, when the locking lever is in the unlatched position, the two gear wheels will be in engagement with each other and, when the locking lever is in the latched position, the two gear wheels will be disengaged from each other.

The first latch member may simply consist of a radial projection on the shank of the locking lever, while the second latch member may consist of a lever or pawl which may be pivoted to its latching position by a device which, according to another feature of the invention, consists of a cam plate which is rigidly secured to the upper hinge member for the back rest and extends coaxially to the pivot axis thereof.

A further feature of the invention consists in providing the counter with a disk which has a radial detent and is rotatably mounted on the upper hinge member for the back rest and coaxially to the pivot axis thereof, and in providing the second latch member with a contact surface which, when this latch member is in its latching position, extends into the path of movement of the detent. When the counter is in its zero position, the detent is located in a position which is in a certain relation to the unlatched position of the second latch member. The distance of the movement of the detent from this position then corresponds to the size of the angle about which the upper hinge member is pivoted.

With these and other objects in view which will become apparent in the following detailed description, the present invention will be clearly understood in connection with the accompanying drawings, in which:

FIG. 2 is a section along the lines II—II of FIG. 1;

FIG. 3 is a detail elevation of parts of the storing mechanism and of the latch members of the hinge fitting according to FIG. 1 in the latched position;

FIG. 4 is a detail elevation of the element of the storing mechanism which controls the latching operation and is acted upon by a pair of resetting springs;

FIG. 5 is a section along the lines V—V of FIG. 4;

FIG. 6 is an elevation of a modification of the element of the storing mechanism which controls the latching operation; and FIG. 7 is a side elevation of a hinge fitting according to a modification of the invention.

Figure 1:
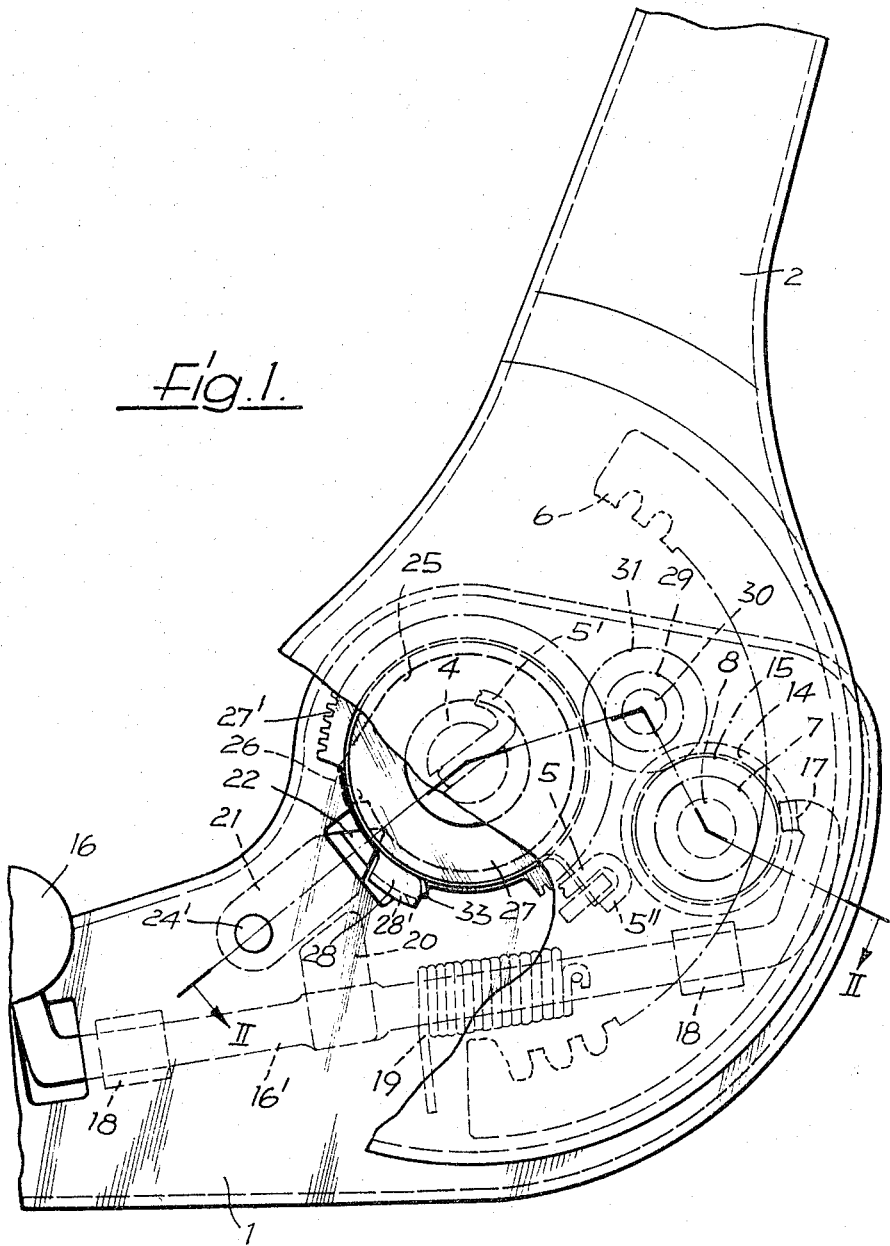
FIGURE 1 is a side elevation of a hinge fitting according to a first embodiment of the invention, in which a part is broken away for better illustration.

Referring now to the drawings, and more particularly to FIGS. 1 and 2, the hinge fitting according to the invention which is primarily intended for a front seat and the associated back rest of an automobile comprises a lower hinge member 1 which is to be secured to the seat, and an upper hinge member 2 which is to be secured to the back rest and is pivotably connected to the lower hinge member 1 by means of a king-pin 4 which is rigidly secured to the upper hinge member 2. A spiral spring 5 which is mounted on an extension 3 of the kingpin 4 is secured at one end 5' to the latter and at the other end 5" to the lower hinge member 1 and tends to pivot the upper hinge member 2 forwardly.

For locking the back rest in any desired inclined position, the upper hinge member 2 is provided with a segmental rack 6 which meshes with a pinion 7 which is rigidly secured to a shaft 8. This shaft 8 which is rotatably mounted in the lower hinge member 1 may be rigidly secured, for example, by a connecting pipe, to the corresponding shaft of the hinge fitting, not shown, which is to be provided on the other side of the seat and back rest.

Shaft 8 is rotatably mounted in the central bore of a first locking member 10 in the form of a bevel gear which is rigidly secured to the lower hinge member 1 and provided with bevel-gear teeth 11. This locking member 10 is operatively associated with a second locking member 12 which is mounted on shaft 8, so as to be axially slidable thereon but nonrotatable relative thereto and is provided with a set of inner bevel-gear teeth 13 which may be engaged with and disengaged from the bevel-gear teeth 11 of the first locking member 10 when the second locking member 12 is shifted in its axial direction by means of a control member in the form of a locking lever 16.

As illustrated in FIGS. 1 and 2, this locking lever 16 is pivotally mounted by bearing members 18 on the lower hinge member 1 and is provided with a laterally bent end portion which terminates into a tooth 17 which engages into an annular groove 14 in the second locking member 12. A torsion coil spring 19 which is mounted on the shank 16' of locking lever 16 exerts upon the latter a torque which, when this lever 16 is released, maintains the teeth 13 on locking member 12 in engagement with the teeth 11 on locking member 10, so that shaft 8 and pinion 7 thereon are then locked in a fixed position.

The hinge fitting for the other side of the seat and back rest is of the same construction as the hinge fitting which has previously been described, except that it does not have a locking lever and locking members.

For latching the locking lever 16 in the releasing position, so that the back rest may be freely pivoted, the shank 16' of this lever 16 carries a radially projecting lug 20 which forms a first latch member and is operatively associated with a pawl 21 which forms the second latch member and is pivotably connected at one end by a rivet 24' or the like to the lower hinge member 1. Pawl 21 is, however, mounted so tightly on rivet 24', that the friction between these parts will prevent the pawl from pivoting downwardly to its latching position by its own weight. Instead of relying upon such a friction, it is also possible to provide a spring of a strength sufficient to hold the pawl 21 in its unlatched position, but too weak to overcome the friction between the lug 20 and the pawl 21 when the latter is in the latching position and therefore also too weak for moving this pawl back to its unlatched position. In the latching position, as illustrated in FIG. 3, pawl 21 overlaps and thus latches the lug 20 and thereby prevents the locking lever 16 from pivoting back to its locking position.

Pawl 21 is provided with a lateral projection 22, as shown particularly in FIGS. 2 and 3, the opposite sides of which form contact surfaces 23 and 24. A cam plate 25 which is rigidly secured to the extension 3 of kingpin 4 has a cam projection 26 which, when the upper hinge member 2 is pivoted beyond the most forward position in which it may still be locked, engages upon the contact surface 23 and pushes the pawl 21 into its latching position. In order to render this possible, it is necessary to hold the locking lever 16 by hand in its releasing position while the upper hinge member 2 is being pivoted to the mentioned forward position. When the pawl 21 is thus moved to its latching position, as shown in FIG. 3, it will remain therein and cam projection 26 may therefore be moved past the projection 22.

For unlatching the locking lever 16 after the back rest has been pivoted forwardly beyond the most forward locking position which is determined by the first point of engagement of cam projection 26 with pawl 21, and when the upper hinge member 2 is accordingly inclined, an annular disk 27 is provided which is rotatably mounted on a ring 4' which is rigidly secured to the kingpin 4. Along a part of its periphery, this disk 27 is provided with teeth 27', while centrally of the recessed part between the toothed part it is provided with a radially projecting detent 28, the free end 28' of which is bent over at a right angle. Teeth 27' are in mesh with a pinion 29 which is rigidly secured to one end of a shaft 30 which is rotatably mounted within the lower hinge member 1 and extends parallel to the shaft 8. The other end of this shaft 30 carries rigidly thereon a gear wheel 31 which is adapted to engage with a set of radial teeth 15 on the locking member 12, but only when the two locking members 10 and 12 are disengaged from each other. The outer wall 1' of the housing or cover of the hinge member 1 in which the shafts 8 and 30 are mounted is reinforced by a plate 32.

The bent-over end 28' of the detent 28 on disk 27 is designed so as to permit it to move past the projection 22 of pawl 21 when the latter is in its unlatched position, as shown in FIGURE 2, but to be stopped by its engagement with the contact surface 24 of this projection 22 when pawl 21 is in its latching position.

When the gear wheel 31 and the locking member 12 are disengaged from each other, one end of a coil spring 33 which is loosely wound around the ring 4' and the other end of which is secured to the hinge member 2 acts upon the radial projection 28 and maintains the latter in its neutral position, as shown in FIG. 1, in which the pawl 21 is disengaged from the lug 20. In this position, the bent-over end 28' of the detent 28 engages with the contact surface 24 and pivots the pawl 21 from its latching position to its unlatched position.

In place of the spring 33 it is also possible to provide two equal springs 34 and 35, as illustrated in FIG. 4, which are loosely mounted on ring 4'. One end of each of these springs is secured to the hinge member 2, while the other ends of both springs act in opposite directions to each other upon a tab 36 which is secured to the lower hinge member 1 and another tab 37 which is secured to and extends in the opposite direction of the bent-over end 28' of the detent 28 on disk 27, as shown in FIGURE 5. Since in the neutral position of detent 28 both springs act thereon with an equal pressure in opposite directions, the location of this neutral position will always be the same and any friction forces which might act upon disk 27 will be eliminated.

If the hinge fitting is of a sufficient size, it is also possible, as shown in FIG. 6, to provide a rack 27'' in place of the annular disk 27. This rack 27'' may be guided, for example, on pins 38 which are secured to the hinge member 2 and extend through longitudinal slots 39 in the rack 27'', and the latter may be acted upon by resetting springs 34' and 35' which are likewise secured at their outer ends to the hinge member 2.

If the back rest is to be pivoted, it is first necessary to pivot the locking lever 16 by hand to its releasing position, in which the locking members 10 and 12 are disengaged from each other and the locking member 12 is engaged with the gear wheel 31. When the upper hinge member 2 is then pivoted in one direction about a certain angle, the annular disk 27 is turned in the same direction and for a distance which is in proportion with this angle. The detent 28 on disk 27 is therefore also shifted in the same proportion. When the back rest is pivoted toward the rear, that is, in the clockwise direction as seen in FIG. 1, the detent 28 is moved past the projection 22 on pawl 21, whereas when the back rest is pivoted forwardly, the detent 28 is turned in the counterclockwise direction. The distance of movement of the detent 28 from its neutral position is in either case in proportion to the angle about which the back rest is pivoted. If the back rest is only pivoted within the angular area in which it may be locked by the locking members and the locking lever 16 is then released by the operator, the locking member 12 interengages with the locking member 10 and thereby disengages from the gear wheel 31. The back rest is thereby again locked and the detent 28 is reset to its neutral position.

If, however, the back rest is pivoted from any inclined position to the most forward locking position which is determined by the point of engagement of cam 26 with the contact surface 23 of pawl 21, and the back rest is then further pivoted forwardly beyond this position, the cam 26 shifts the pawl 21 to its latching position, provided the locking lever 16 is held by hand in its releasing position until the back seat has been pivoted beyond its most forward locking position. As soon as pawl 21 is in its latching position, as shown in FIG. 3, the locking lever 16 may be released and the back rest may then be freely pivoted forwardly as far as possible. The distance of the movement of the detent 28 in the counterclockwise direction from its neutral position is then proportional to the angular distance of the pivoting movement of the upper hinge member 2.

When the back rest is pivoted toward the rear and reaches a certain inclined position, the bent-over end 28' of the detent 28 on disk 27 engages upon the contact surface 24 of pawl 21 and, by overcoming the friction between the pawl 21 and the lug 20, it pivots the pawl to its unlatched position. This unlatching occurs exactly at the time when the detent 28 is located in its neutral position, that is, when the back rest is located in the same inclined position to which it was originally adjusted before being pivoted forwardly. Since the locking lever 16 when being unlatched is pivoted by the action of the spring 19 to its locking position, the back rest, upon being pivoted toward the rear from its most forward locking position, will again be automatically locked in the position to which it was originally adjusted. This is due to the fact that, independently of the position to which the back rest was originally adjusted, the detent 28 is shifted at every pivoting movement from its neutral position. It is thus evident that disk 27, pinion 29, and gear 31 in cooperation with pawl 21 form a storing mechanism which memorizes or stores the exact angular distance which the upper hinge member 2 together with the back rest is pivoted forwardly from any inclined position in which it was previously locked to any point beyond the most forward locking position.

Referring now again to the drawings, and more particularly to FIG. 7, a hinge fitting is illustrated according to a modification of the invention which differs from the hinge fitting as previously described merely by a different design of the locking members and of the releasable connection between the storing mechanism and the upper hinge member. All other parts of this hinge fitting which are similar to those as described with reference to FIGS. 1 to 4 are therefore designated in FIG. 7 by the same reference numerals, except that they are increased by 100.

The first locking member of the hinge fitting according to FIG. 7 consists of the segmental rack 106, while the second locking member consists of a shorter segmental rack 106' which may be engaged with or disengaged from the rack 106 and is secured to the locking lever 116 which is pivotable about an axis which extends parallel to the main pivot axis of the hinge fitting. The pinion 107 which meshes with the rack 106 and is rotatably mounted within the lower hinge member 101 also meshes with a pinion 140 which is rotatably mounted on a bracket 141 which is pivotable about the axis of the pinion 107. The locking lever 116 is further provided with a projection 142, which, when lever 116 is moved to its releasing position, moves the pinion 140 into engagement with the teeth 127' on the disk 127 which is of the same construction as the disk 27 according to FIGURE 1. When the locking lever 116 is returned to its locking position, pinion 140 is again disengaged from the teeth on disk 127.

The latch members consist in this case of a projection 120 on the locking lever 116 and a pawl 121 which is pivotably mounted on the lower hinge member 101 and has a projection 121' on its lower arm which, when pawl 121 is moved to its latching position, slides underneath the projection 120 and then catches the latter.

The manner of operation of the latching means and of the means for pivoting the pawl 121 is the same as described with reference to the first hinge fitting and therefore does not need to be further described.

While we have disclosed several embodiments of the present invention, it is to be understood that these embodiments are given by example only and not in a limiting sense, the scope of the present invention being determined by the objects and the claims.

We claim:
1. A hinge fitting for adjusting the inclination of the back rest of a seat, especially of a motor vehicle, comprising a pair of hinge members pivotably connected to each other, a first of said hinge members adapted to be secured to the seat and the second hinge member to the back rest, means for rigidly locking said hinge members in different inclined positions to each other comprising a first locking member rigidly secured to said first hinge member, and a second locking member movable relative to said first locking member and associated with said second hinge member, a manually movable control member connected with said second locking member for moving the same into locking engagement with and to a releasing position from said first locking member, respectively, a first latch member secured to said control member, and a second latch member adapted to be moved by said second hinge member into latching engagement with said first latch member when said control member is moved to its releasing position and said second hinge member is then pivoted from any inclined position in which it was previously locked to a point near the end of its forward movement, so that said control member is thereby arrested in its releasing position, and a storage mechanism means memorizing the angular distance of said forward pivoting movement and for separating said latching members when said second hinge member during its subsequent backward movement reaches exactly the original inclined position and locks said second hinge member and said back rest thereon in its original position, by the movement of said locking members again into engagement with each other by means of said unlatched control member.

2. The hinge fitting as set forth in claim 1, wherein said control member consists of a locking lever having a shank mounted on said first hinge member and adjustable to said locking and releasing positions.

3. The hinge fitting as set forth in claim 1, wherein said storing mechanism means comprises a mechanically operating counter.

4. The hinge fitting as set forth in claim 3, wherein said counter comprises a gearing.

5. The hinge fitting as set forth in claim 1, further comprising resetting means for holding said storing mechanism means in its zero position when said locking members are in engagement with each other.

6. The hinge fitting as set forth in claim 4, wherein said gearing comprises a gear wheel connected to and positively turned by said second hinge member when being pivoted, and a second gear wheel rotatably mounted on said second hinge member, said control member when being moved to its releasing position adapted to engage said gear wheels with each other and when being moved to its locking position adapted to disengage said gear wheels from each other.

7. The hinge fitting as set forth in claim 5, wherein said resetting means comprise at least one resetting spring.

8. The hinge fitting as set forth in claim 2, wherein said first latch member consists of a radial projection on said shank of said locking lever, said second latch member consisting of a pawl pivotably mounted on said second hinge member, and a cam plate connected to said second hinge member so as to be nonrotatable relative thereto and being coaxial to the pivot axis thereof and adapted to pivot said second latch member to its latching position when said second hinge member is being pivoted forwardly to a point near the end of its forward movement.

9. The hinge fitting as set forth in claim 4, further comprising a shaft rigidly secured to said first hinge member, said second hinge member pivotably connected to said shaft, said counter comprising a disk having a projecting detent thereon and rotatably mounted on said shaft, said second latch member having a contact surface located within the path of movement of at least a part of said detent when said second latch member is in its latching position.

10. The hinge fitting as set forth in claim 9, wherein when said counter is in its zero position, said detent is in a position in a certain relation to the unlatched position of said second latch member, the movement of said detent from said position corresponding to the size of the angle about which said second hinge member is pivoted.

References Cited

UNITED STATES PATENTS 3,156,004  11/1964  Strien et al. _____ 16—146

FOREIGN PATENTS 1,300,072  6/1962  France.

BOBBY R. GAY, *Primary Examiner.*

MARVIN A. CHAMPION, *Examiner.*

D. L. TROUTMAN, *Assistant Examiner.*